United States Patent

[11] 3,581,229

| | | |
|---|---|---|
| [72] | Inventor | William S. Martin<br>Schenectady, N.Y. |
| [21] | Appl. No. | 755,653 |
| [22] | Filed | Aug. 27, 1968 |
| [45] | Patented | May 25, 1971 |
| [73] | Assignee | General Electric Company |

[54] FACE-PUMPED LASER DEVICE WITH OPTICAL PATH FOLDING
10 Claims, 3 Drawing Figs.

[52] U.S. Cl............................................. 331/94.5, 330/4.3
[51] Int. Cl.............................................. H01s 3/00
[50] Field of Search.................................. 331/94.5; 330/4.3

[56] References Cited
UNITED STATES PATENTS

| 3,307,113 | 2/1967 | Hughes.......................... | 331/94.5 |
| 3,383,621 | 5/1968 | Luck, Jr., et al............... | 331/94.5 |
| 3,404,350 | 10/1968 | Muncheryan.................. | 331/94.5 |
| 3,431,511 | 3/1969 | Fyler............................. | 331/94.5 |
| 3,466,569 | 9/1969 | Chernoch...................... | 331/94.5 |

*Primary Examiner*—Ronald L. Wilbert
*Assistant Examiner*—V. P. McGraw
*Attorneys*—John F. Ahern, Paul A. Frank, Julius J. Zaskalicky, Frank L. Neuhauser, Oscar B. Waddell and Louis A. Moucha ABSTRACT: A face-pumped laser device employs a prism with an index of refraction at least equal to the square root of two adjacent and optically contacted to the surface of the active laser medium. The prism provides for refraction and total internal reflection of the pumping radiation which is directed to and is substantially uniformly incident upon the surface of the active laser medium, thus increasing the pumping flux density by the square root of two over conventional techniques. A plurality of prisms positioned on the opposite side of the laser medium are utilized in conjunction with the first mentioned prism to fold the optical path in such a manner that a generated or input laser beam may be made to penetrate a different region of the laser medium on each pass.

Inventor:
William S. Martin,
by Paul A. Frank
His Attorney.

Inventor:
William S. Martin,
by Paul A. Frank
His Attorney.

FACE-PUMPED LASER DEVICE WITH OPTICAL PATH FOLDING

This invention relates to a face-pumped laser device, and more particularly, to a face-pumped laser device having a means for increasing the flux density of radiation incident upon the surface of the active laser medium and for folding the laser beam optical path.

The present application is related to the copending applications of J. P. Chernoch and H. R. Koenig, Ser. No. 315,054, filed Oct. 9, 1963, now Pat. No. 3,423,693; application Ser. No. 467,941 of K. Tomiyasu and J. C. Almasi, filed June 29, 1965, now Pat. No. 3,500,231; application Ser. No. 491,921 of J. P. Chernoch, filed Oct. 1, 1965, now Pat. No. 3,466,569; application Ser. No. 644,142 of J. P. Chernoch and W. S. Martin, filed June 7, 1967, application Ser. No. 755,654 of J. C. Almasi and W. S. Martin, filed concurrently herewith; and the application of J. C. Almasi and W. S. Martin, Ser. No. 755,652, filed concurrently herewith, all of which are assigned to the present assignee.

Laser devices, which are now well known in the art, generate or amplify coherent electromagnetic radiation generally in the visible and infrared regions of the electromagnetic spectrum. For purposes of description, such wavelengths of radiation are termed "optical radiation" herein. One characteristic of the emitted optical radiation is its narrow wavelength band and another is its spatial coherence. For the emission of the coherent radiation to occur, a condition called "population inversion" must exist within the active medium. When the condition is present, a large number of electrons in the active medium are in a metastable energy state. An incident photon of the laser emission wavelength may stimulate a transition from the metastable state to a lower state. These transitions are cumulative, resulting in the emission of coherent radiation. Population inversion may be achieved by irradiating the laser medium with high intensity electromagnetic radiation having the appropriate energy to place the electrons in the metastable state. This radiation is called the "pumping radiation" and the pumping radiation source is known as the "pumping means."

A particular type of laser device described and claimed in various environments, modifications, and combinations in the aforementioned related copending applications is the "face-pumped" type of laser. Face-pumping of laser devices permits uniform activation across the aperture of a large diameter laser body, achieving high energy output without introducing the undesirable effects caused by conventional side pumping of standard rod-type laser bodies.

The active laser medium of a face-pumped laser typically is in the form of a planar member having a thickness dimension along a line normal to the major surfaces thereof which is small compared with the transverse dimension across the major surfaces. The major surfaces (and the medium cross section) may be circular, elliptical, rectangular, or in any other configuration desired.

With the development of the face-pumped laser, optical arrangements are continuously being investigated through which the amount of pumping radiation incident upon the surface of the active laser medium may be uniformly increased. Such a uniform increase is desirable because the amount of inversion created within an active laser medium is a function of the flux density (energy per unit area) of the pumping radiation. It is also desirable to efficiently extract the stored inversion energy by achieving a higher energy density of the laser beam on every surface element of the laser medium.

It is therefore an object of the present invention to provide means for uniformly increasing the flux density of pumping radiation incident upon the active surface of a laser device.

Another object of the present invention is to provide means for uniformly increasing the flux density of pumping radiation incident upon the active surface of a face-pumped laser device.

Yet another object of the present invention is to provide means for efficiently extracting the stored inversion energy in a face-pumped laser device.

Briefly, in accord with the present invention, I provide a face-pumped laser device with an optical system which includes an optical collecting means having optical and dimensional characteristics causing pumping radiation flux density on a surface adjacent the active laser medium to be approximately the square root of two times as large as the pumping radiation flux densities of the surfaces adjacent the pumping means. By closely juxtaposing the active laser medium comprising a plurality of active planar laser elements to the surface of the optical collecting means adjacent thereto, the elements also experience the increased flux density.

An optical reflecting means may be positioned in the optical system and in cooperation with the optical collecting means causes beams of emitted coherent laser radiation to pass back and forth through the laser elements, penetrating a different region of the elements on each pass.

The features of my invention which I desire to protect are pointed out with particularity in the attached claims. The invention itself, together with further objects and advantages thereof, is best understood by referring to the accompanying drawings and description in which:

Figure 1:
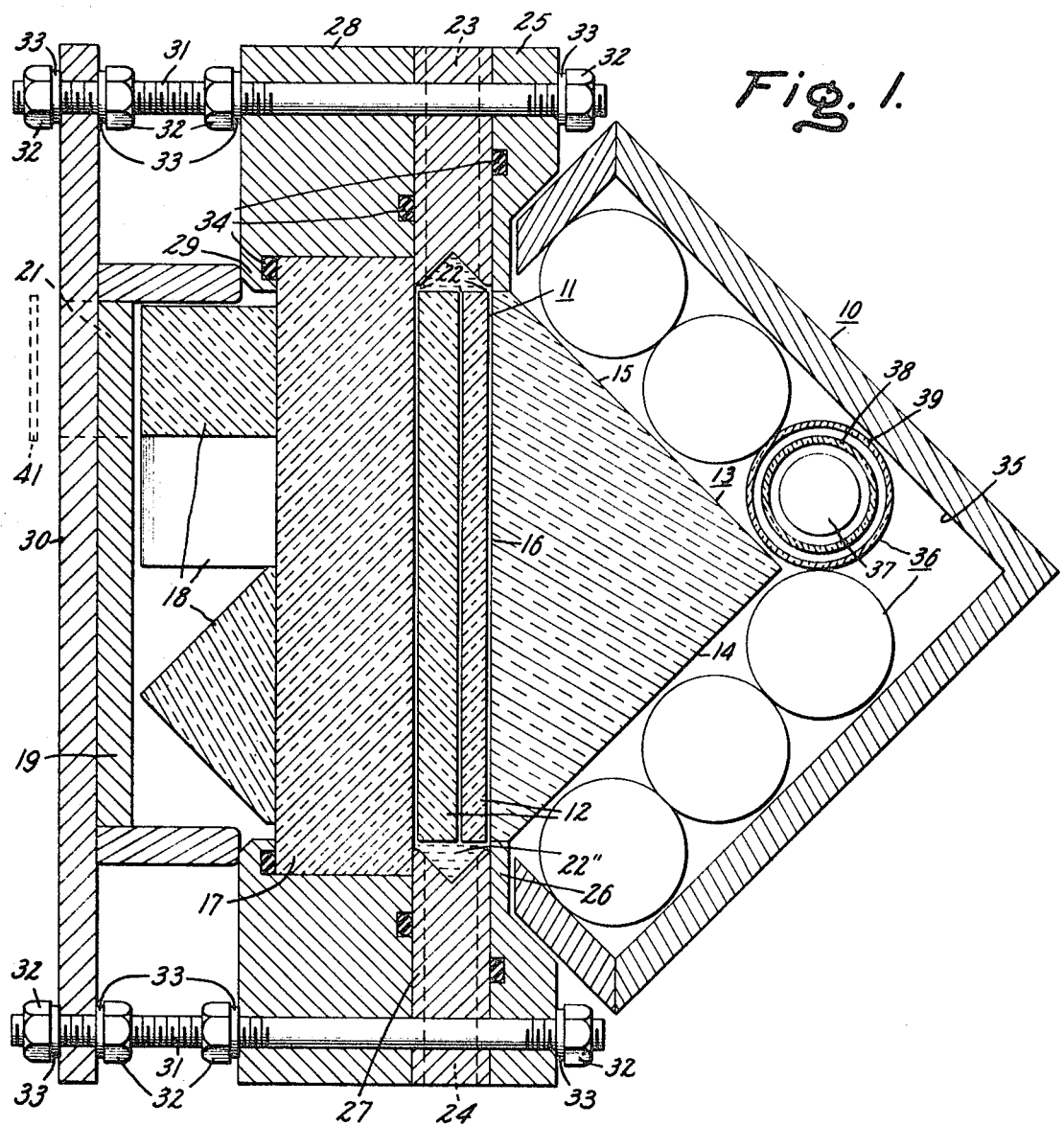
FIG. 1 illustrates, in vertical cross section, an immersion structure for a face-pumped laser device with a beam folding arrangement.

IN FIG. 1, a laser amplifying device is comprised of a pumping means 10 and a laser module 11. Preferably, laser module 11 has as the active laser medium a plurality of planar laser elements 12 arranged with their major surfaces in a substantially parallel relationship. It is understood, however, that a single laser element 12 may be employed when desired in particular circumstances.

Between pumping means 10 and planar laser elements 12 is a prism 13 having surfaces 14 and 15 substantially facing pumping means 10 and a surface 16 which is closely juxtaposed to a first planar laser element 12. Surface 16 has approximately the same linear dimensions as the major surfaces of planar laser elements and is also substantially parallel thereto. On the opposite side of planar laser elements 12 and closely juxtaposed thereto is an optically flat substrate 17. A group of prisms 18 may be positioned adjacent the other face of substrate 17. Backing prisms 18 is a reflector 19 which is substantially totally reflecting to pumping radiation and is employed to reflect unabsorbed pumping radiation back into the active laser medium. Reflector 19 is provided with an entrance port 20 for incoming beams of coherent radiation and exit port 21 (see FIG. 3) for amplified output beams of coherent radiation.

As disclosed and claimed in greater detail in the aforementioned application Ser. No. 755,652, fluid coolant having an index of refraction substantially the same as that of the laser medium may be employed to extract unwanted heat produced in the laser medium during operation. By allowing the coolant to contact the major surfaces of the medium, wavelength tolerance requirements of the laser medium surfaces are relaxed. This arrangement is extremely beneficial when working with thin laser members and by uniformly extracting generated heat, allows increased pulse repetition rates while maintaining optical uniformity across the aperture.

Thus, a plurality of channels 22 run between each of the laser elements 12, and along the closely juxtaposed surfaces of prism 13 and substrate 17. A fluid coolant 22" flows in a predetermined manner through channels 22 from input conduit 23 to output conduit 24. Prism 13 is maintained in its proper position by prism mounting 25 having a shoulder 26 physically in contact with a portion of prism 13. A solder seal may be provided at the contact boundary. Similarly, a laser positioning member 27 ensures proper positioning of laser elements 12. Input and output conduits 23 and 24 in member 27 allow ingress and egress of the fluid coolant 22". Substrate 17 is in contact with both member 27 and a substrate positioning member 28. An upper and lower portion of reflector 19 contacts shoulder 29 of member 28. A reflector support frame 30 is maintained in a rigid position through double-ended bolts or threaded studs 31 which extend through all the positioning members and which secure the positioning members in cooperation with nuts 32 and washers 33. To prevent possible leakage of the liquid coolant, O-ring seals 34 are provided at appropriate locations.

Pumping means 10 comprises a suitable reflector 35 which may be, for example, fabricated from alumina and a plurality of discharge lamps 36, as, for example, xenon flash lamps. Discharge lamps 36 are preferably arranged in array which, when pumping means 10 is positioned adjacent laser module 11, is parallel to surfaces 14 and 15 of prism 13. Discharge lamps 36 may conveniently have a central flash lamp 37 circumscribed by water jacket 38 and an outer ultraviolet, infrared filter jacket 39.

Figure 2:
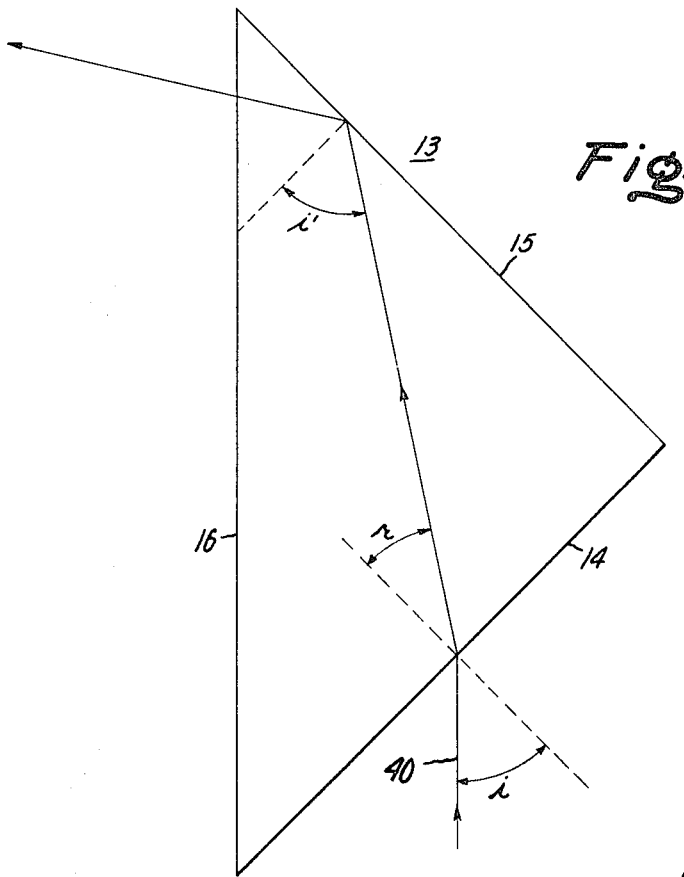
FIG. 2 is a schematic optical diagram of a light beam traversing a prism having an index of refraction equal to or greater than the square root of two.

In operation, reflector 35 serves to concentrate pumping radiation on surfaces 14 and 15 of prism 13. Prism 13 may be of the Porro type having one right angle and two 45° degree angles and is fabricated from fused silica having an index of refraction greater than the square root of two. FIG. 2 of the drawings illustrates a schematic view governing the optics. It is easily demonstrated that due to refraction and total internal reflection any beam of radiation entering surface 14 or surface 15 is always directed to surface 16. In FIG. 2, a beam of radiation 40 enters surface 14 at an angle of incidence $i$ and is refracted at an angle of refraction $r$. The index of refraction of air is substantially 1 and the index of refraction of prism 13 is $\geq \sqrt{2}$ as stated previously. Thus, using the above in the well-known optical expression, Snell's law, $$\sin i \geq \sin r \times \sqrt{2}$$

since $i$ must have the values $$0° \leq i \leq 90°,$$

then $r$ must have the values $$0° \leq r \leq 45°.$$

It may also be shown geometrically that $$r + i' = 90°,$$

where $i'$ is the angle of incidence of beam 40 at surface 15. Thus, $i'$ must have the values $$45° \leq i' \leq 90°.$$

According to the well-known critical angle principle, a beam of radiation passing from a medium having a high index of refraction $n$ to one having a lower index of refraction of unity experiences total internal reflection when $$\sin i'_c \geq 1/n,$$

where $i'_c$ is the critical angle. Since $n$ is chosen to be $\geq \sqrt{2}$, then $i'_c \geq 45°$. Since $i'$ is always at least 45°, then total internal reflection must always take place for a beam internally incident upon surfaces 14 or 15, therefore beam 40 is reflected to surface 16.

As stated previously, prism 13 is fabricated from material having an index of refraction equal to or greater than the square root of two; therefore, all the pumping radiation transmitted through surfaces 14 and 15 is directed to surface 16. Since surface 16 is in contact with fluid coolant 22'' with approximately matching refractive index, the pumping radiation passes through surface 16 and is incident upon the major surfaces of planar laser elements 12. Consequently, because the area of surface 16 (and preferably each major surface of planar element 12) is $1/\sqrt{2}$ as large as the combined surface areas of surface 14 and surface 15, the pumping flux density is increased by $\sqrt{2}$ over conventional pumping arrangements. Pumping radiation which is not absorbed by laser members 12 on the first pass through is reflected back through the laser medium by reflector 19, except for a small loss out of laser input hole 20 and laser output hole 21 in reflector 19.

Other materials from which the elements of the device of FIG. 1 may conveniently be constructed are substantially as follows: planar laser elements 12 may be comprised of neodymium glass, for example, and are commercially obtainable from American Optical Company under the number AOLux 0835 and may conveniently have dimensions of approximately 10cm ×10cm ×1/2cm. The faces thereof ordinarily must be polished to substantially optical smoothness which is about one-tenth wavelength at a wavelength of 1.06 microns, the wavelength of coherent radiation emitted by a neodymium glass laser. As stated previously, however, the presence of a liquid coolant having an index of refraction approximately the same as that of the laser medium relaxes the above surface tolerances to approximately one wavelength.

The neodymium glass laser material which may be employed in the preferred embodiment of the present invention is sensitive and strongly absorbing to pumping optical radiation in the range of approximately 5000 to 9000 Angstrom units and is operative when pumped to emit radiation having a wavelength of 1.06 microns. Alternatively, planar elements 12 may be of ruby, or other available material which produces the desired results as outlined herein.

The optically transparent substrate 17 is constructed of a material which is transparent to both the pumping radiation and the coherent laser radiation. Such a material may be, for example, fused silica or quartz. While the inner face which is in contact with the coolant fluid may have a relaxed surface tolerance (up to 1 wavelength), the outer face is polished to the desired one-tenth wavelength flatness.

The coolant fluid 22'' may be a liquid such as dimethyl sulfoxide which has an index of refraction of 1.48. This substantially matches the index of refraction of 1.5 of the neodymium glass.

The filter jacket 36 utilized to filter out the infrared and ultraviolet radiation emitted by the flash lamps 37 may be any suitable filter adapted to pass radiation in the 5000 to 9000 Angstrom unit wavelength band. Alternatively, a filter may be imposed between pumping means 10 and prism 13.

Figure 3:
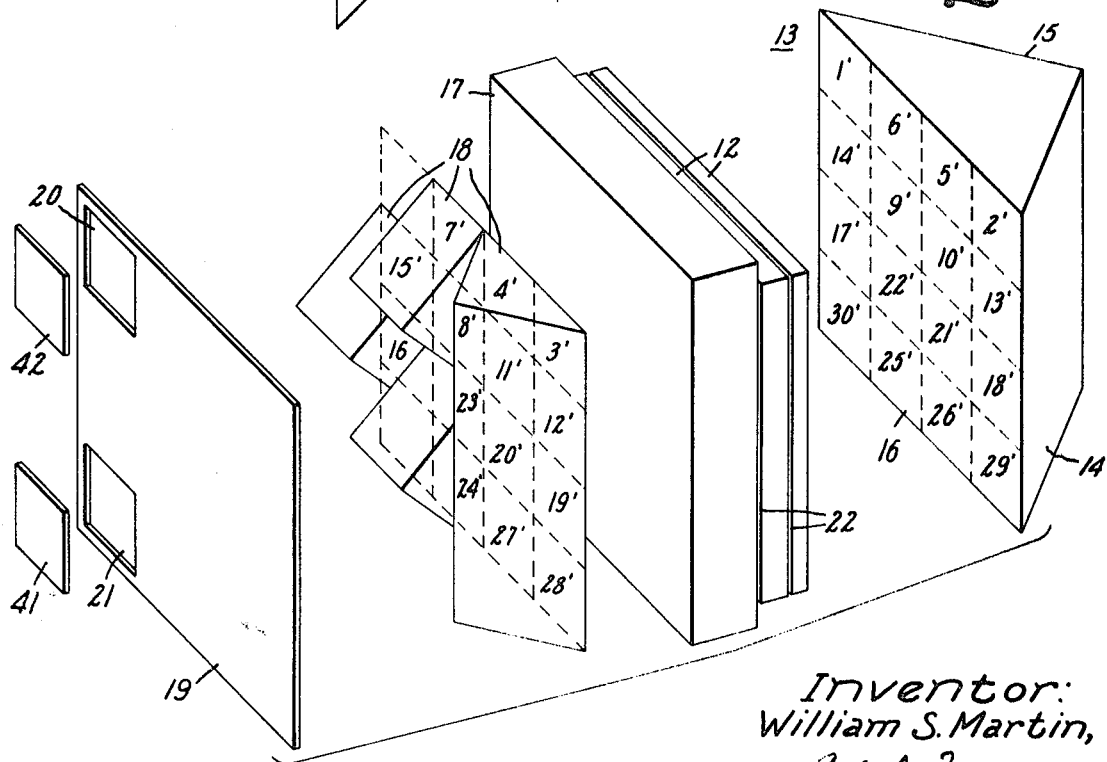
FIG. 3 is a diagram of a beam folding arrangement using a plurality of prisms in conjunction with the prism of FIG. 2.

Referring to FIG. 3, which illustrates in perspective the Porro or right angle prism system of FIG. 1, it can be seen that prism 13 has its surface 16 divided into a four-by-four matrix, with each region numbered to depict the sequential order in which that region is penetrated by a laser beam. Opposite surface 16 of prism 13 is the plurality of prisms 18 which have similarly numbered regions. Thus, when a laser beam enters the input hole 20 (see FIG. 1), it first travels to region 1', experiences two total internal reflections, passes through region 2', and continues to region 3'. The reflections continue until the beam penetrates region 30'. The reflections continue until the beam penetrates region 30' and leaves the system via laser beam output hole 21. Since planar laser elements 12 have substantially the same linear dimensions as surface 14 of prism 13, are positioned between prism 13 and prisms 18, and have their major surfaces substantially parallel to surface 16, the laser beam sequentially passes through 16 regions of each laser planar element 12. It is understood, however, that the number of passages may be increased or decreased by merely changing the number of prisms 18 employed.

In an alternative embodiment, a suitable return reflector 41 positioned at exit port 21 is shown by dotted lines in FIG. 1 and in FIG. 3 and is substantially totally reflecting to the coherent radiation that enters the entrance port 20 and is amplified by the planar laser elements 12. Therefore, beams of coherent radiation ordinarily leaving the exit port 21 are reflected back through the laser medium and exit from the laser device through entrance port 20. Reflector 41 also may be positioned at a slight angle to the prism system so that the beam exits at a slightly different angle from the input beam. When it is desired to utilize the laser device as a laser oscillator, a mirror 42 partially reflective to coherent radiation may be positioned over the entrance port 20 as seen in FIG. 3.

In previous face-pumped laser devices, techniques employed to fold the laser beam path and to separate the laser beam from the pumping means utilized various reflection schemes with dielectric mirrors. After extended operation of the laser device, however, dielectric mirrors are subject to deterioration. The laser device of my present invention reduces the number of mirrors needed and is mechanically compact and stable.

Another feature, made possible by the utilization of the above described prism system, is the substantial elimination of transverse modes because the optical axis of the laser beam relative to the prisms may be adjusted to provide angular mode selection.

From the foregoing discussion, it is apparent that the objectives as set forth herein have been met. Thus, by utilizing the characteristics of a totally reflecting prism, I have found that it is possible to increase the incident light flux density on the surface of an active laser medium by a factor of the square root of two. By employing a plurality of right angle prisms on the opposite side of the active laser medium from the totally reflecting prism, I have also disclosed an optical system through which a laser beam may be made to pass through the laser medium a large number of times, but through a different region on each pass. This constitutes a highly efficient technique for extracting the stored inversion energy.

As shown, the face-pumped laser device and optical system of my present invention is readily adaptable to other advantageous structures of face-pumped lasers such as the discussed face-cooled laser device. Therefore, while only certain preferred features of the invention have been shown, many modifications and changes will occur to those skilled in the art. It is understood that the appended claims are intended to cover all such modifications and changes as fall within the true spirit and scope of the invention.

What I claim as new and desire to secure by Letters Patent of the United States is:

1. A laser device of the face-pumped type comprising:
   pumping means for the emission of high energy, electromagnetic pumping radiation;
   optical collecting means positioned adjacent said pumping means and having a first surface indirectly illuminated by the pumping radiation and a plurality of surfaces directly illuminated by the pumping radiation to cause the pumping radiation flux density on the first surface to be approximately the square root of two times as large as pumping radiation flux densities on the directly illuminated surfaces; and
   an active laser medium emitting high energy coherent radiation and comprising at least one first planar laser element with major surfaces having transverse dimensions thereof which are larger than the distance between said major surfaces wherein one of said major surfaces is closely juxtaposed to said first surface of said optical collecting means.

2. The laser device of claim 1 wherein said optical collecting means is a right angle prism having an index of refraction of at least the square root of two.

3. The laser device of claim 2 wherein said active laser medium comprises more than one planar laser element, each with major surfaces having transverse dimensions which are larger than the distance between major surfaces, said planar laser elements being separated by channels; and wherein a fluid coolant, having an index of refraction approximately the same as that of said planar elements flows through said channels and along said major surfaces of said planar elements.

4. In the laser device of claim 1, optical reflecting means positioned adjacent said active laser medium on the opposite side thereof from said optical collecting means, wherein said optical collecting means and said optical reflecting means are adapted to receive a high energy beam of coherent radiation, to cause a plurality of discrete passages of the beam between said optical collecting and reflecting means by causing penetration of a different region of said active laser medium during each passage and to transmit the beam in amplified form.

5. The laser device of claim 4 wherein said optical collecting means is a right angle prism having an index of refraction at least the square root of two and said optical reflecting means comprises at least one prism.

6. The laser device of claim 4 wherein said optical collecting means is a right angle prism having an index of refraction at least the square root of two and said optical reflecting means comprises a plurality of prisms.

7. The laser device of claim 6 including a substrate separating said active laser medium and said optical reflecting means, wherein said substrate is optically transparent to the pumping and coherent radiation.

8. The laser device of claim 7 including means positioned adjacent said optical reflecting means on the opposite side thereof from said active laser medium, said means having entrance and exit ports allowing a beam of high energy coherent radiation to enter and the amplified beam to exit respectively through said entrance and exit ports.

9. The laser device of claim 8 including first reflecting means which is substantially totally reflecting to coherent radiation and is positioned at an angle to said exit port on the opposite side thereof from said active laser medium wherein a coherent radiation beam traversing said active laser medium is reflected by said first reflecting means back through said exit port, retraverses said active laser medium as a result of the plurality of passages between said optical collecting and reflecting means, and exists through said entrance port.

10. The laser device of claim 9 including second reflecting means which is partially reflecting to coherent radiation and is positioned adjacent said entrance port on the opposite side thereof from said active laser medium.